United States Patent
Byeon

(10) Patent No.: US 10,453,186 B2
(45) Date of Patent: Oct. 22, 2019

(54) SYSTEM AND METHOD FOR CORRECTING ERROR OF CAMERA

(71) Applicant: Hyundai Mobis Co., Ltd., Seoul (KR)

(72) Inventor: Myung Suk Byeon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 213 days.

(21) Appl. No.: 15/627,444

(22) Filed: Jun. 20, 2017

(65) Prior Publication Data

US 2018/0075585 A1 Mar. 15, 2018

(30) Foreign Application Priority Data

Sep. 9, 2016 (KR) .................. 10-2016-0116525

(51) Int. Cl.
| | |
|---|---|
| *G06K 9/36* | (2006.01) |
| *G06K 9/64* | (2006.01) |
| *G06K 9/03* | (2006.01) |
| *G06T 5/00* | (2006.01) |
| *H04N 7/18* | (2006.01) |
| *G06K 9/62* | (2006.01) |
| *G06K 9/46* | (2006.01) |
| *B60R 1/12* | (2006.01) |

(Continued)

(52) U.S. Cl.
CPC .............. *G06T 5/002* (2013.01); *B60R 1/12* (2013.01); *G06K 9/4604* (2013.01); *G06K 9/6202* (2013.01); *G06T 7/33* (2017.01); *H04N 5/23229* (2013.01); *H04N 7/183* (2013.01); *B60R 2001/1253* (2013.01); *B60R 2300/207* (2013.01); *B60R 2300/30* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 9,357,208 B2 | 5/2016 | Gupta et al. | |
| 2005/0219530 A1* | 10/2005 | Horibe ................ | G01S 7/4972 |
| | | | 356/399 |

(Continued)

FOREIGN PATENT DOCUMENTS

| | | |
|---|---|---|
| KR | 10-2011-0126178 | 11/2011 |
| KR | 10-2013-0059929 | 6/2013 |

OTHER PUBLICATIONS

Tsai, "A Versatile Camera Calibration Techniaue for High-Accuracy 3D Machine Vision Metrology Using Off-the-shelf TV Cameras and Lenses", IEEE Journal of Robotics and Automation, vol. RA-3, No. 4, Aug. 1987, pp. 323-344 (Year: 1987).*

*Primary Examiner* — Randolph I Chu
(74) *Attorney, Agent, or Firm* — H.C. Park & Associates, PLC

(57) ABSTRACT

A system is provided for correcting an error of a camera for a camera monitoring system (CMS), including a camera attached to a side of a vehicle, a memory configured to store processor-executable instructions for correcting an error of an image captured by the camera, and a processor configured with the processor-executable instructions to detect a correction point is the image captured by the camera, generate a correction parameter based on a resultant value of a comparison between the detected correction point and a preset correction point, and correct the error of the image based on the generated correction parameter.

10 Claims, 10 Drawing Sheets

(51) Int. Cl.
*H04N 5/232* (2006.01)
*G06T 7/33* (2017.01)

(56) References Cited

U.S. PATENT DOCUMENTS

| | | | |
|---|---|---|---|
| 2006/0184297 A1* | 8/2006 | Higgins-Luthman | B60R 1/00 |
| | | | 701/41 |
| 2010/0245576 A1* | 9/2010 | Inui | G06T 7/80 |
| | | | 348/148 |
| 2012/0002611 A1 | 1/2012 | You et al. | |
| 2014/0043473 A1* | 2/2014 | Gupta | H04N 17/00 |
| | | | 348/135 |
| 2015/0049193 A1* | 2/2015 | Gupta | G03B 43/00 |
| | | | 348/148 |
| 2016/0014406 A1* | 1/2016 | Takahashi | G06T 7/73 |
| | | | 348/148 |
| 2016/0037032 A1* | 2/2016 | Iwama | G06T 7/73 |
| | | | 348/148 |
| 2017/0122762 A1* | 5/2017 | van der Molen | G01C 21/32 |
| 2018/0225838 A1* | 8/2018 | Ohara | G06T 7/593 |
| 2019/0001868 A1* | 1/2019 | Kaino | B60Q 1/1423 |

* cited by examiner

SYSTEM AND METHOD FOR CORRECTING ERROR OF CAMERA

CROSS-REFERENCE TO RELATED APPLICATION

This application claims priority to and the benefit of Korean Patent Application No. 2016-0116525, filed on Sep. 9, 2016, which is hereby incorporated by reference for all purposes as if set forth herein.

BACKGROUND

Field

Exemplary embodiments relate to a system and a method for correcting an error, and more particularly, to a system and a method for correcting an error of a camera for a camera monitoring system (CMS) of a vehicle.

Discussion of the Background

Recently, to provide convenience to a driver while driving and parking, cameras for acquiring a front view, a rear view, or side views have been mounted on a vehicle.

More and more errors may occur in an image output on a display due to a vehicle continuously being used after shipment and various environmental factors that occur while driving, such as a vibration of the vehicle, a folding of a side mirror, and an opening/closing of a vehicle door which change a tolerance of a camera calibrated at a time of shipment.

Therefore, a driver may have an inconvenience of using a distorted image during driving or parking.

To remove the inconvenience, the changed tolerance needs to be calibrated, but it is currently necessary to visit a service center or a shop offering tolerance calibration and repair the camera for tolerance calibration.

Meanwhile, to remove these limitations, Korean Laid-open Patent Publication No. 10-2011-0126178 (title: Rear camera control system of vehicle and method thereof) discloses a technology of operating a rear camera even while driving backward, parking/stopping, and driving a vehicle according to a manipulation of a driver.

That is, in a conventional technology, a driver views an image and manually operates an angle adjuster to generate an angle adjustment setting signal for operating a rear camera so that an angle of the camera is adjusted by an angle adjustment motor driving part.

However, the conventional technology requires the driver to adjust the angle of the camera by manually operating the angle adjuster such that the driver is inconvenienced due to the direct adjustment.

In addition, since the camera angle needs to be directly adjusted by a human, the angle may be set differently each time so that a sense of a heterogeneity may be generated for an image output on the display.

The above information disclosed in this Background section is only for enhancement of understanding of the background of the invention and, therefore, it may contain information that does not constitute prior art.

SUMMARY

Exemplary embodiments of the present invention provide a system and a method for correcting an error in which, when an error exists in an image captured by a camera attached to a side of a vehicle, a vanishing point or a feature point is detected in the image and is set as a correction point, a correction parameter for correcting the image is generated based on the correction point, and a correction is performed so that the error existing in the image is corrected.

The technical objectives of the inventive concept are not limited to the above disclosure, and other objectives may become apparent to those of ordinary skill in the art based on the following descriptions.

To achieve the above-described objectives, according to a first aspect of the present invention, a system for correcting an error of a camera for a camera monitoring system (CMS) is provided. The system includes a camera attached to a side a vehicle; a memory configured to store processor-executable instructions for correcting an error of an image captured by the camera; and a processor configured with the processor-executable instructions to detect a correction point in the image captured by the camera, generates a correction parameter based on a resultant value of a comparison between the detected correction point and a preset correction point, and corrects the error of the image based on the generated correction parameter.

The processor may be further configured with processor-executable instructions to extract a contour line from the image and detect the correction point in the image from which is the contour line is extracted.

The correction point may be further configured with the processor-executable instructions to detect a plurality of lines in the image from which the contour line is extracted, detect the vanishing point at which the plurality of lines intersect, and move the detected vanishing point to a reference vanishing point to generate the correction parameter. The correction point may be the vanishing point.

The processor may be further configured with the processor-executable instructions to detect a plurality of feature points corresponding to the vehicle in the image from which the contour line is extracted and move the plurality of feature points to reference feature points to generate the correction parameter. The correction point may be a feature point of the vehicle.

The processor may be further configured with the processor-executable instructions to generate the correction parameter when the vehicle is driven or stopped and update a previously stored correction parameter to the generated correction parameter.

According to a second aspect of the present invention, a method for correcting an error of a camera for a CMS is provided. The method includes receiving an image captured by a camera attached to a side of a vehicle; detecting a correction point in the image; comparing the detected correction point with a preset correction point; generating a correction parameter based on a resultant value of the comparison; and correcting an error of the image based on the generated correction parameter.

The method may further include extracting a contour line from the image, wherein the detecting of the correction point may include detecting the correction point in the image from which the contour line is extracted.

The detecting of the correction point in the image may include: detecting a plurality of lines in the image from which the contour line is extracted; detecting a vanishing point at which the plurality of lines intersect; and setting the detected vanishing point as the correction point, wherein the comparing of the detected correction point and the preset correction point and the generating of the correction parameter based on the resultant value of the comparison may include moving the detected vanishing point to a reference vanishing point to generate the correction parameter.

The detecting of the correction point in the image may include: detecting a plurality of feature points corresponding to the vehicle in the image from which the contour line is extracted; and setting the plurality of feature points as correction points, wherein the comparing of the detected correction point with the preset correction point and the generating of the correction parameter based on a resultant value of the comparison may include moving the detected feature points to reference feature points to generate the correction parameter.

The generating of the correction parameter may include generating the correction parameter when the vehicle is driven or stopped and updating a previously stored correction parameter to the generated correction parameter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
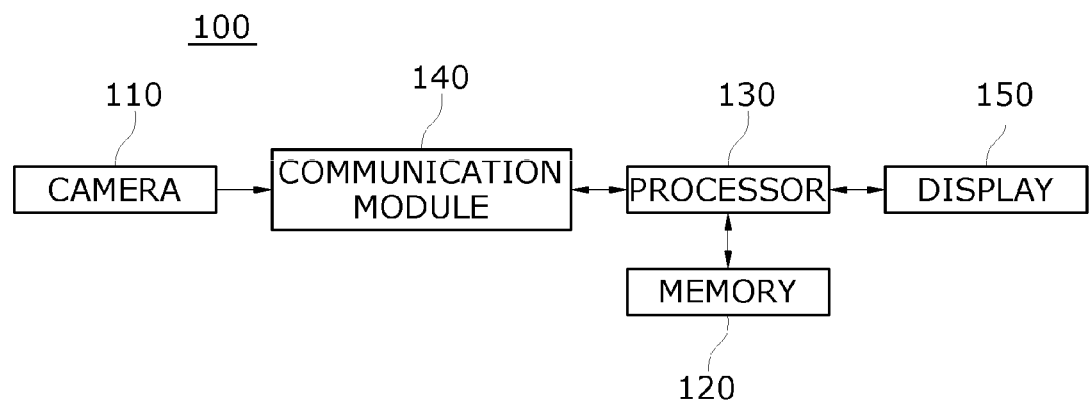
FIG. 1 is a block diagram illustrating a system for correcting an error according to an exemplary embodiment of the present invention.

Hereinafter, exemplary embodiments of the present invention will be described in detail with reference to the accompanying drawings so that those skilled in the art may easily carry out the present invention. The present invention may be embodied in various ways and is not to be construed as limited to the embodiments set forth herein. In the drawings, parts irrelevant to the description have been omitted for the clarity of explanation.

The term "comprises," "includes," "comprising," and/or "including" means that one or more other components, steps, and operations and/or the existence or addition of elements may be included in addition to the described components, steps, operation, and/or elements unless context dictates otherwise.

The present invention relates to a system 100 for correcting an error of a camera for a camera monitoring system (CMS) installed in a vehicle, and a method thereof.

The CMS is a system which replaces a side mirror attached to a vehicle with a camera and is capable of outputting a side view image of the vehicle, which is input to the camera, on a display.

When a camera for a CMS is installed at a position of a side mirror of the vehicle or at a specific position of a side surface of the vehicle, an image output on a display may have a minute difference between vehicles due to a mechanical error or a manufacturing error.

In addition, even after mass-production of vehicles, a camera may have an error due to continuous deformation of a fixed device or a camera module according to an actual driving environment.

According to an exemplary embodiment of the present invention, in order to solve the above-described limitations, a vanishing point or a feature point is detected in an image captured by a camera 110 attached to a side of a vehicle and is set as a correction point, a correction parameter for correcting the image is generated based on the set correction point, and correction is performed so that an error existing in the image is corrected.

Hereinafter, the system 100 for correcting an error according to an exemplary embodiment of the present invention will be described with reference to FIGS. 1, 2A, 2B, 2C, 2D, 3A, 3B, 3C, and 3D.

FIG. 1 is a block diagram illustrating the system 100 for correcting an error according to an exemplary embodiment of the present invention.

The system 100 for correcting an error includes the camera 110, a memory 120, and a processor 130.

The camera 110 is attached to a side of a vehicle to capture a side view image of the vehicle. One or more cameras each identical to the camera 110 may be provided at a side of the vehicle.

The memory 120 is configured to store processor-executable instructions for correcting an image captured by the camera 110. In this case, the memory 120 generally refers to a non-volatile storage device that maintains stored information without power being supplied thereto and a volatile storage device.

For example, the memory 120 may include a NAND flash memory, such as a compact flash (CF) card, a secure digital (SD) card, a memory stick, a solid-state drive (SSD), and a micro SD card; a magnetic computer storage device, such as a hard disk drive (HDD); and an optical disk drive such as a compact disc read only memory (CD-ROM), and digital versatile disc read only memory (DVD)-ROM.

The processor 130 executes the processor-executable instructions stored in the memory 120. That is, the processor 130 detects a correction point in an image captured by the camera 110 and generates a correction parameter based on a resultant value of a comparison between the detected correction point and a preset correction point.

Based on the correction parameter generated, the processor 130 corrects an error of the image.

In this case, the preset correction point is a point that is set as a default at a time of manufacturing or repairing a vehicle. According to the preset correction point, an image captured by the camera 110 is output on a display 150.

The display 150 is a screen on which an output of a navigation system installed in a vehicle is displayed. The display 150 outputs the image captured by the camera 110, and when an error exists in the image, the display 150 receives and outputs an image corrected by the processor 130.

Meanwhile, the image captured by the camera 110 may be transmitted to the memory 120 and the processor 130 through a communication module 140. The communication module 140 may include a wired communication module and a wireless communication module. The wired communication module may be implemented with a power line communication device, a telephone line communication device, a Multimedia over Coax Alliance (MoCA) protocol for networking over in-home coaxial cable, an Ethernet protocol, an IEEE1294 protocol, an integrated wired home network, and an RS-485 control device. In addition, the wireless communication module may be implemented with a wireless local area network (WLAN), a Bluetooth protocol, a high-data-rate wireless personal area network (HDR WPAN), a ultra-wideband (UWB) protocol, a ZigBee protocol, an impulse radio protocol, a 60 GHz WPAN, a binary-code division multiple access (CDMA) protocol, wireless Universal Serial Bus (USB) technology, and wireless high-definition multimedia interface (HDMI) technology.

More preferably, the communication module 140 may transmit and receive data through controller area network (CAN) communication.

The system 100 for correcting an error according to the exemplary embodiment of the present invention may correct an error by detecting a vanishing point or a feature point in an image captured by the camera 110. Hereinafter, the error correction may be described with reference to FIGS. 2A, 2B, 2C, 2D, 3A, 3B, 3C, and 3D.

FIGS. 2A, 2B, 2C, and 2D are diagrams illustrating a process of correcting an error by detecting a vanishing point.

Figure 2A:
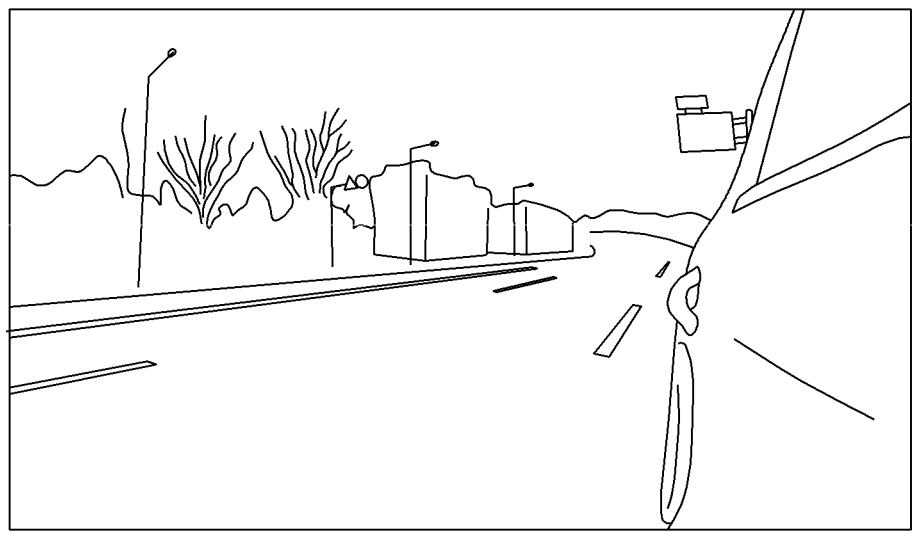
FIGS. 2A, 2B, 2C, and 2D are diagrams illustrating a process of correcting an error by detecting a vanishing point.

First, as shown in FIG. 2A, the processor 130 extracts a contour line from an image captured by the camera 110. The processor 130 may apply an algorithm for detecting a contour line of an object included in the image, for example, a Sobel filter.

After detecting the contour line in the image, the processor 130 may detect a vanishing point in the image from which the contour line is extracted and may set the vanishing point as a correction point.

Figure 2B:
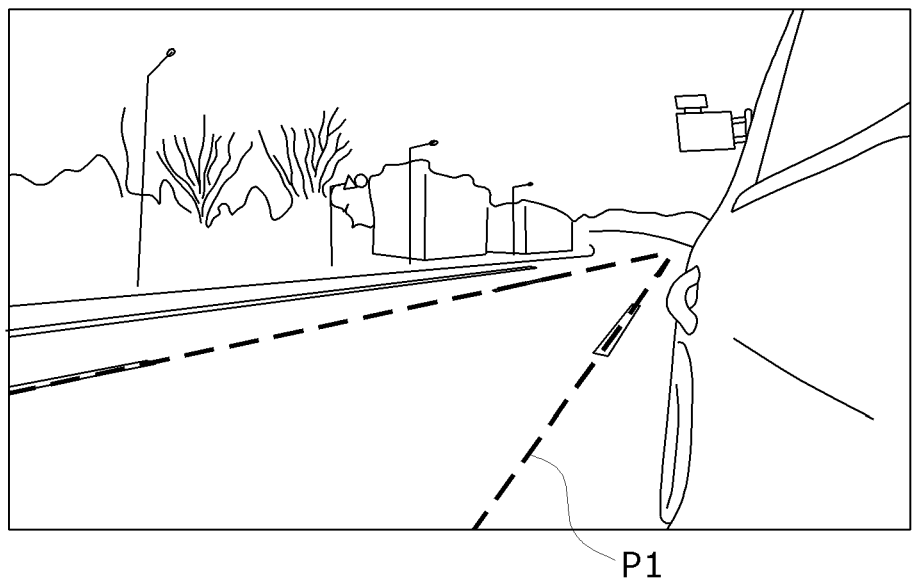
Figure 2C:
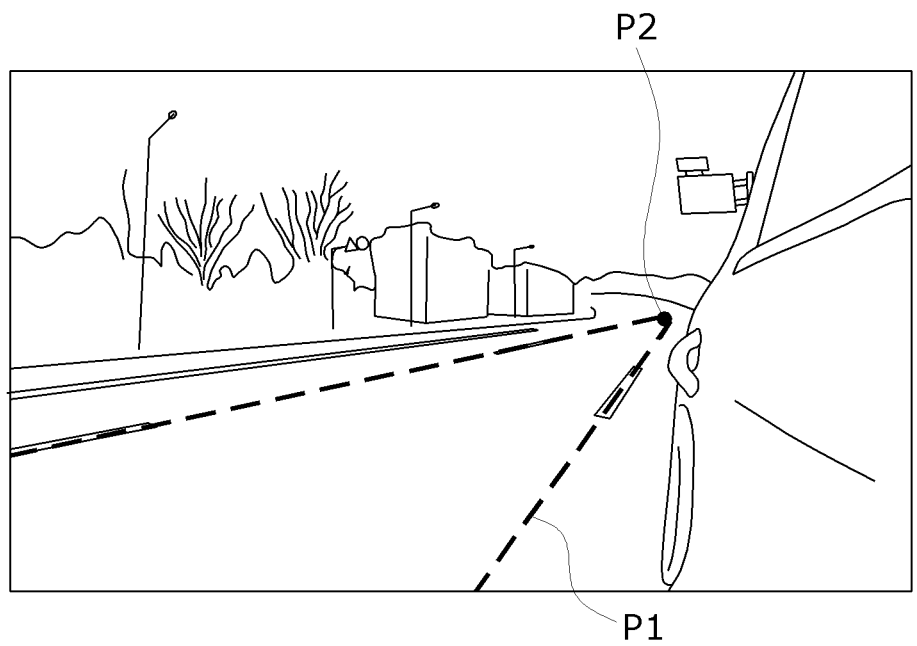

That is, as shown in FIG. 2B, the processor 130 detects a plurality of lines, such as a center line of a road and a dividing line of a road, in the image from which the contour line is extracted. Then, as shown in FIG. 2C, the processor 130 detects a point at which a plurality of detected lines intersect and sets the point as a correction point.

Figure 2D:
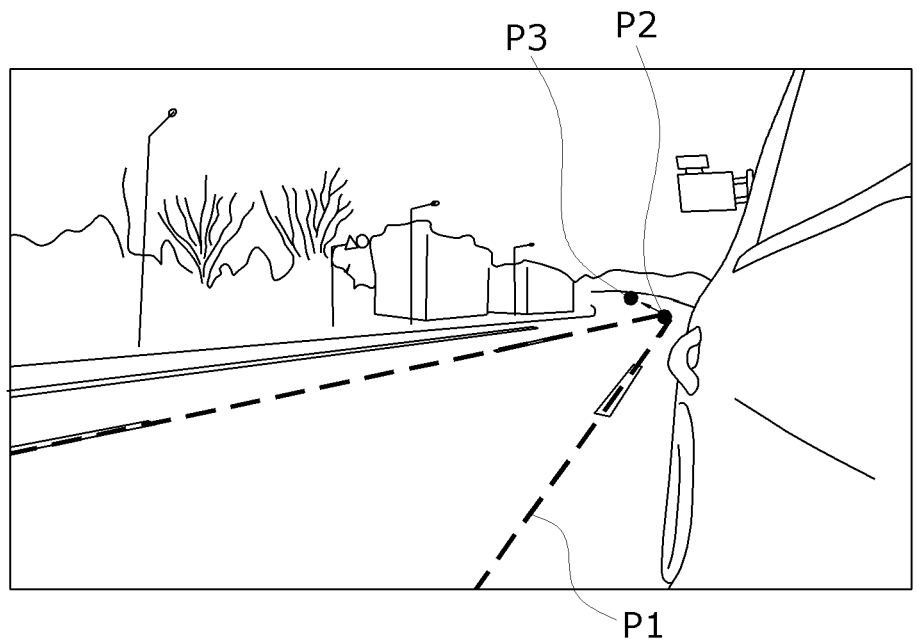

After detecting the correction point, as shown in FIG. 2D, the processor 130 may generate a correction parameter by moving the detected vanishing point to a reference vanishing point, and may correct an error of the image captured by the camera 110 using the generated correction parameter.

FIGS. 3A, 3B, 3C, and 3D are diagrams illustrating a process of correcting an error by detecting a feature point.

Figure 3A:
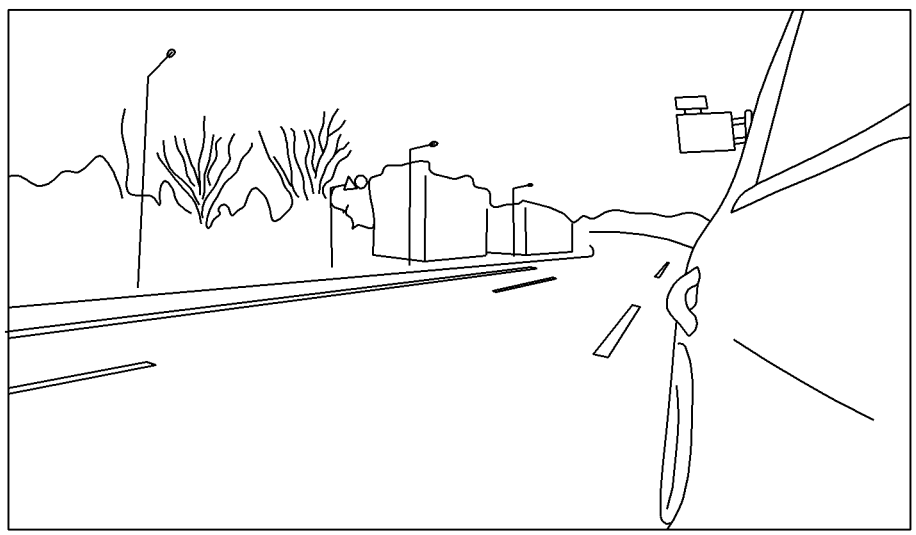
FIGS. 3A, 3B, 3C, and 3D are diagrams illustrating a process of correcting an error by detecting a feature point.
Figure 3B:
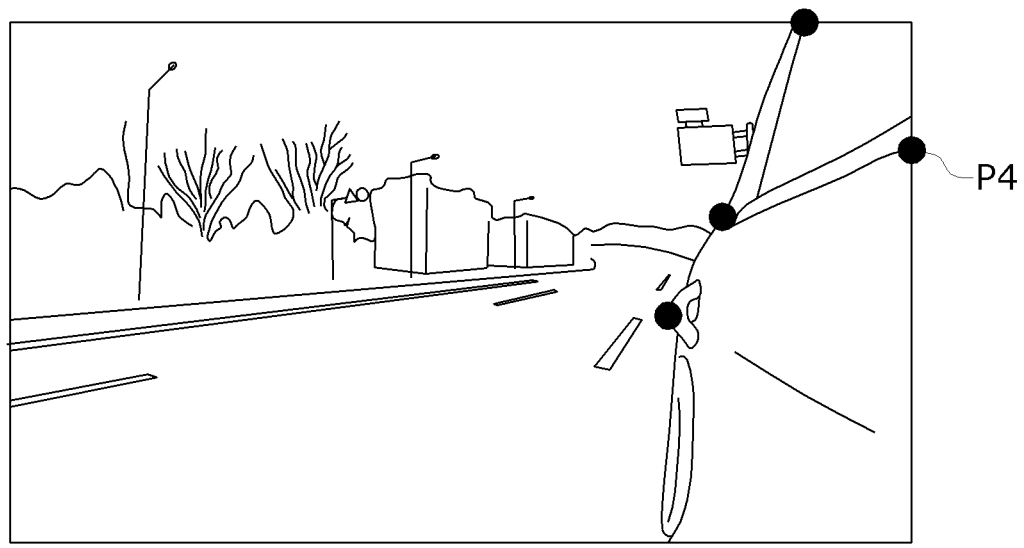

Similar to the above, as shown in FIG. 3A, the processor 130 extracts a contour line of an object from an image. As shown in FIG. 3B, the processor 130 detects a plurality of feature points (e.g., four feature points of a vehicle body) corresponding to a vehicle in the image from which the contour line is extracted.

In this case, the processor 130 may detect the plurality of feature points corresponding to the vehicle by applying an algorithm for detecting a feature point in the image from which the contour line is detected, for example, speeded up robust features (SURF), scale invariant feature transform (SIFT), or the like.

Figure 3C:
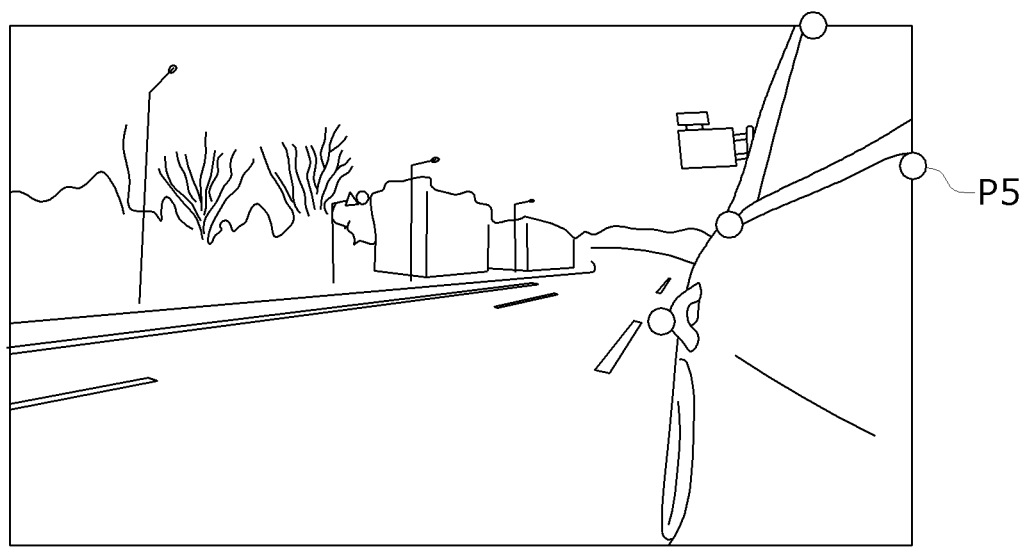
Figure 3D:
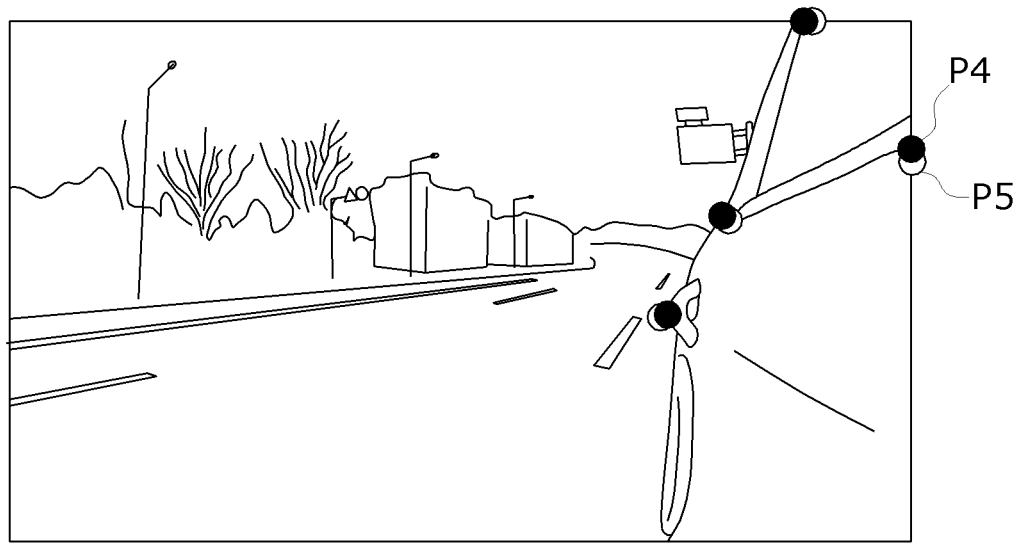

Meanwhile, as shown in FIG. 3C, feature points corresponding to a vehicle are preset in a manufacturing stage, and thus, as shown in FIG. 3D, the processor 130 may generate a correction parameter by moving the plurality of detected feature points to the preset feature points.

In this case, the processor 130 may move the detected features to the preset feature points utilizing a perspective matrix algorithm and the like.

Meanwhile, the processor 130 may generate a correction parameter according to the methods illustrated in FIGS. 2A, 2B, 2C, 2D, 3A, 3B, 3C, and 3D at a time of driving or stopping a vehicle, and when a new correction parameter is generated, a previously stored correction parameter may be updated to the new correction parameter so that the new correction parameter is applied to correct an error.

For reference, the components illustrated in FIG. 1 according to the exemplary embodiment of the present invention may be implemented in the form of hardware, such as a field programmable gate array (FPGA) or application specific integrated circuit (ASIC), and may serve specific functions.

However, the components are not limited to referring to software or hardware, and each of the components may be provided on an addressable storage medium, or may allow one or more processors to be run.

Thus, as an example, a component may include components, such as software components, object-oriented software components, class components, and task components, and processes, functions, attributes, procedures, subroutines, segments of a program code, drivers, firmware, microcode, circuitry, data, databases, data structures, tables, arrays, and parameters.

Components and functions provided in the components may be combined into fewer components or may be further divided into additional components.

Hereinafter, referring to FIGS. 4, 5, and 6, a method of correcting an error in the system 100 according to an exemplary embodiment of the present invention will be described.

Figure 4:
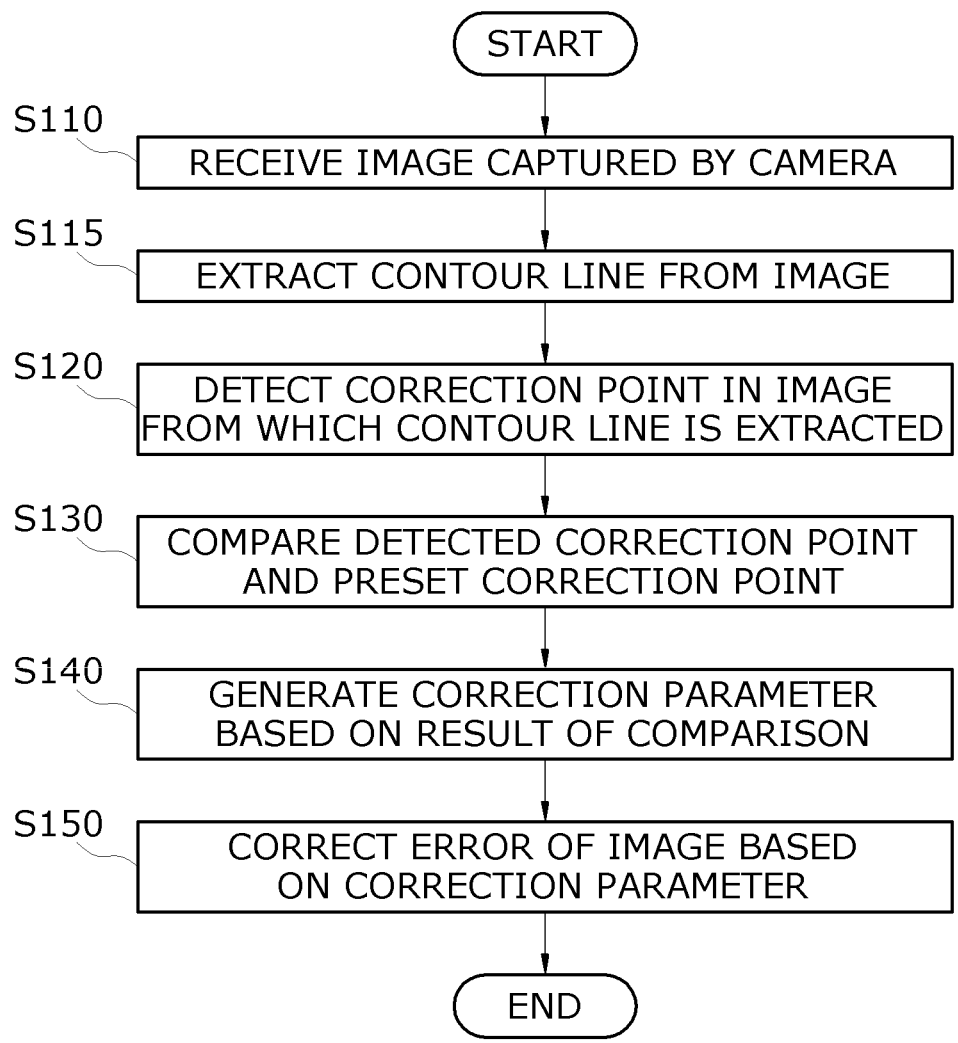
FIG. 4 is a flowchart showing a method of correcting an error according to an exemplary embodiment of the present invention.

FIG. 4 is a flowchart showing a method of correcting an error according to an exemplary embodiment of the present invention.

First, the method of correcting an error of a camera for a CMS according to the exemplary embodiment of the present invention includes receiving an image captured by a camera attached to a side of a vehicle (S110), and detecting a correction point in the image (S120).

Then, the detected correction point is compared with a preset correction point (S130), a correction parameter is generated based on a resultant value of the comparison between the detected correction point and the preset correction point (S140), and an error of the image is corrected based on the generated correction parameter (S150).

The exemplary embodiment of the present invention may further include extracting a contour line from the received image (S115). Accordingly, the exemplary embodiment of the present invention may detect the correction point in the image from which the contour line is extracted.

Meanwhile, the correction point according to the exemplary embodiment of the present invention may be a vanishing point or a feature point, and details thereof will be described with reference to FIGS. 5 and 6.

Figure 5:
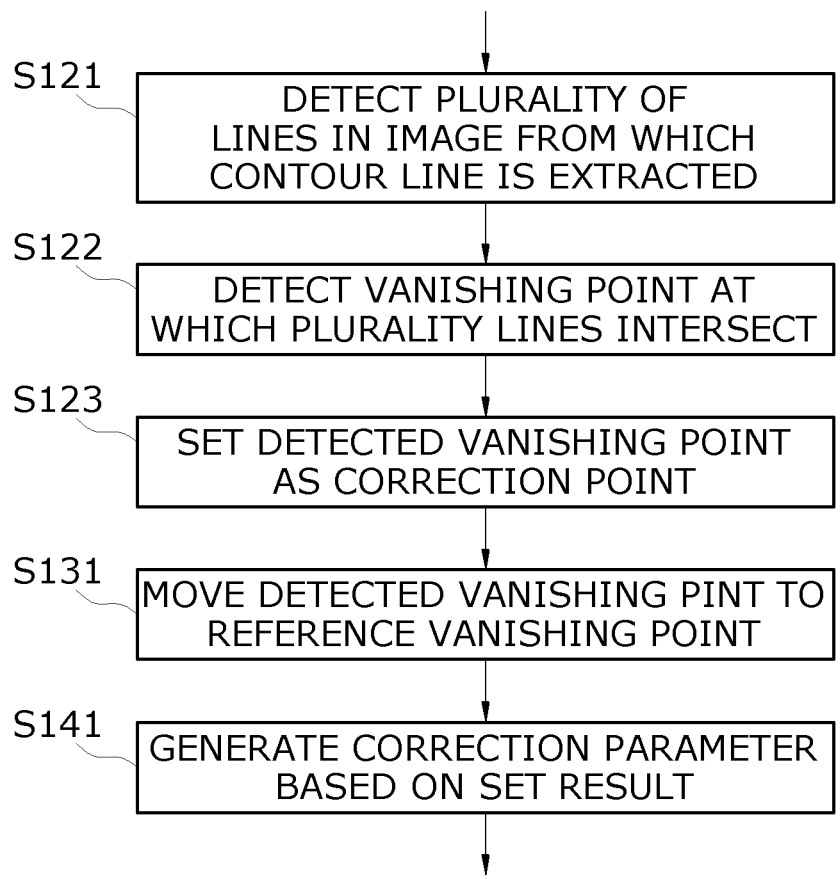
FIG. 5 is a flowchart showing a method of correcting an error by detecting a vanishing point.

FIG. 5 is a flowchart showing a method of correcting an error by detecting a vanishing point.

When correcting an error by detecting a vanishing point, first, a plurality of lines are detected in an image from which a contour line is extracted (S121).

Then, a point at which the plurality of lines intersect is set as the vanishing point (S122), and the detected vanishing point is set as a correction point (S123).

Since the vanishing point is set as the correction point, the detected vanishing point is set to be moved to a reference vanishing point (S131) to generate a correction parameter (S141).

Figure 6:
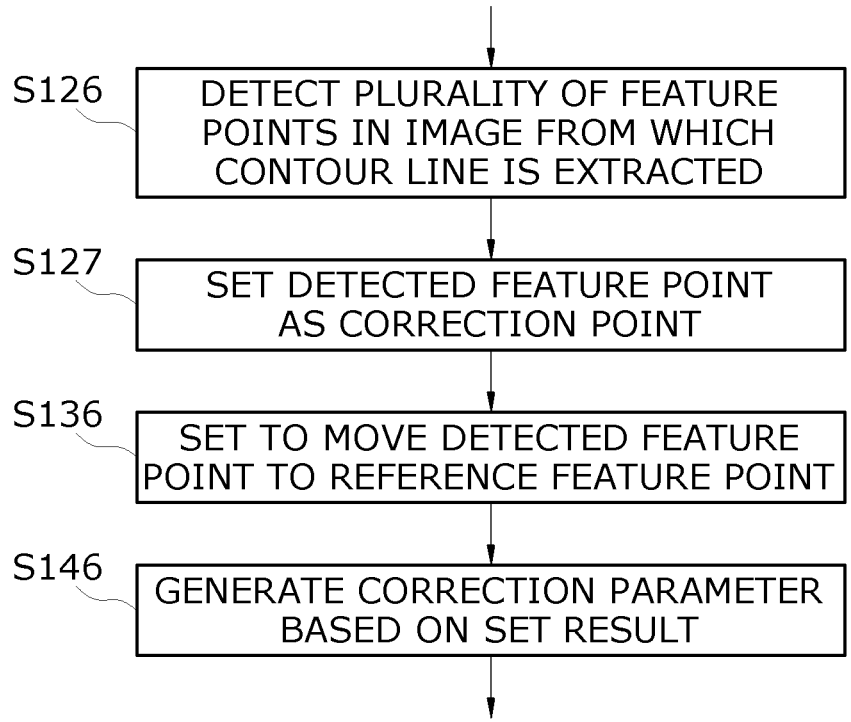
FIG. 6 is a flowchart showing a method of correcting an error by detecting a feature point.

FIG. 6 is a flowchart showing a method of correcting an error by detecting a feature point.

When correcting an error by detecting a feature point, first, a plurality of feature points corresponding to a vehicle are detected in an image from which a contour line is extracted (S126) and are set as correction points (S127).

Since the feature points are set as the correction points, the detected feature points are set to be moved to reference feature points (S136) to generate a correction parameter (S146).

In the above description, operations S110 to S150 may be further divided into additional operations or combined into fewer operations according to an exemplary embodiment of the present invention. In addition, some of the operations may be omitted as necessary, and the operations may be performed in a different order. In addition, even when other content is omitted, the content described with reference to FIGS. 1, 2A, 2B, 2C, 2D, 3A, 3B, 3C, and 3D may be applied to the method of correcting an error shown in FIGS. 4, 5, and 6.

FIGS. 7A, 7B, 7C and 7D are views illustrating a result of error correction according to an exemplary embodiment of the present invention.

The system 100 for correcting an error according to the exemplary embodiment of the present invention and the method thereof may correct a distortion error of the camera 110 which is altered after being mass produced due to a driving environment.

Figure 7A:
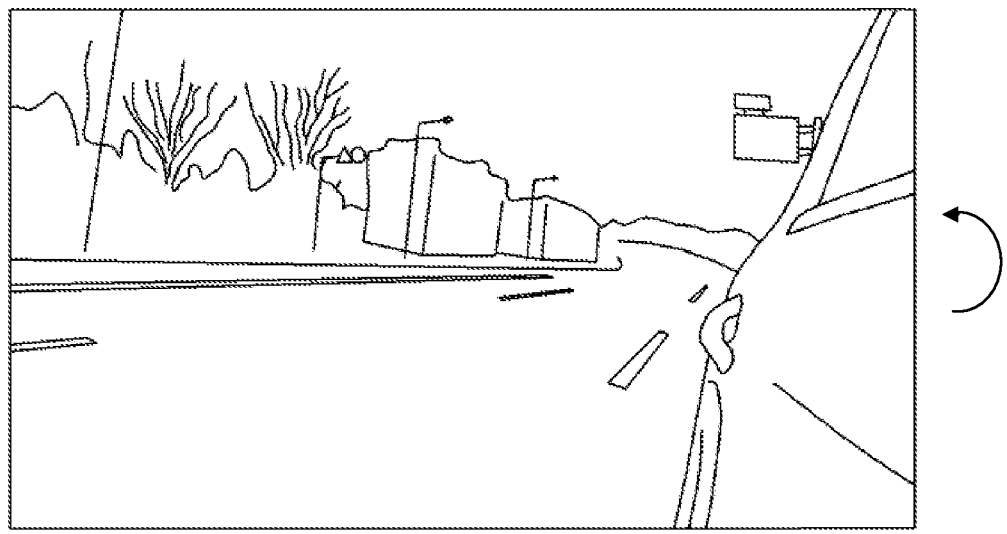
FIGS. 7A, 7B, 7C, and 7D are views illustrating a result of error correction according to an exemplary embodiment of the present invention.
Figure 7B:
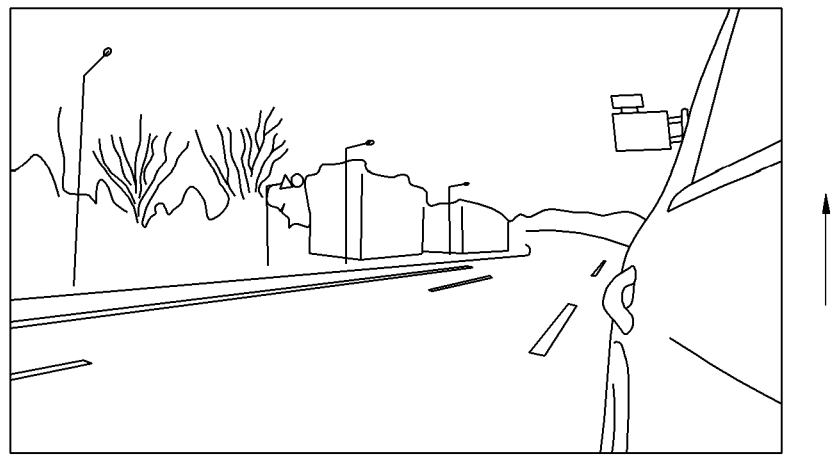
Figure 7C:
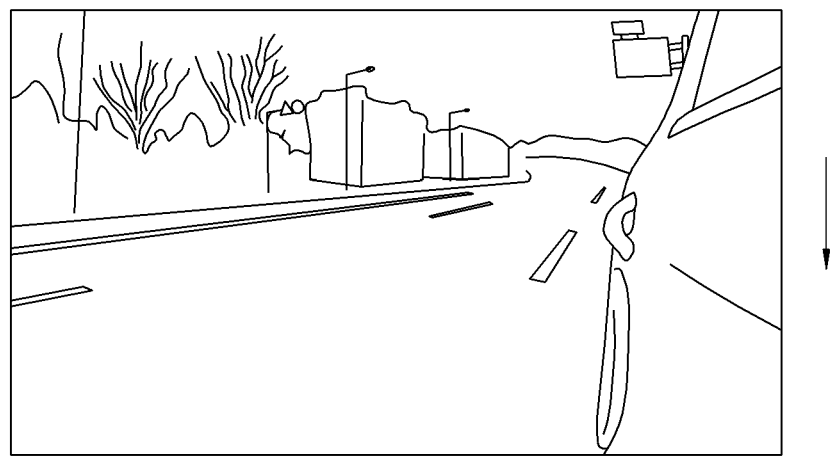
Figure 7D:
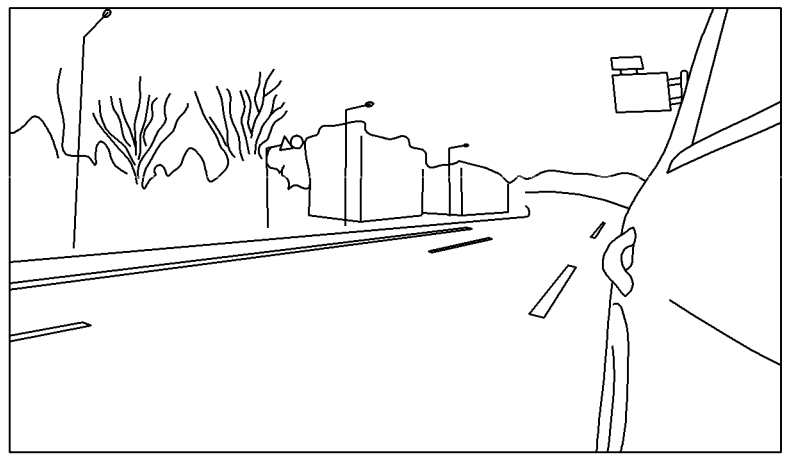

That is, when an error exists in a image captured by the camera, the captured image shown in FIG. 7A requires a counterclockwise rotation, the captured image shown in FIG. 7B requires an upward movement, and the captured image shown in FIG. 7C requires a downward movement. Therefore, the corresponding error correction is performed on the captured image so that a corrected image shown in FIG. 7D is provided to a driver.

According to any one of the above-described exemplary embodiments of the present invention, since an error existing in an image captured by a camera while driving or stopping is corrected, a driver can be provided with a more accurate image.

In addition, since an error of an image is corrected by comparing a vanishing point or a feature point and a preset correction point, image error correction fan be achieved with a smaller amount of data than used in a conventional technology.

Meanwhile, the method of correcting an error according to the exemplary embodiment of the present invention may be implemented in the form of a recording medium that contains a computer program or instructions stored in a medium executed by a computer or that contains instructions executable by the computer. The computer-readable media may be any available media that may be accessed by computers, and include all of volatile and nonvolatile media and removable and non-removable media. The computer-readable medium may include all of computer storage media and communication media. The computer storage media include all of volatile, nonvolatile, removable, and non-removable media, which are implemented using any method or technology for the storage of information, such as computer readable instructions, data structures, program modules, or other data. Typically, the communication media include computer readable instructions, data structures, program modules, other data of modulated data signals such as carrier waves, or other transmission mechanisms, and include any information transfer media.

As should be apparent from the above, an error, existing in an image captured by a camera while a vehicle is driven or stopped is corrected so that a driver can be provided with a more accurate image.

Although the method and system of the invention have been described in connection with specific exemplary embodiments of the invention, some or all of the components or operations thereof may be realized using a computer system that has general-use hardware architecture.

The above description of the invention is for illustrative purposes, and a person having ordinary skilled in the art should appreciate that other specific modifications can be easily made without departing from the technical spirit or essential features of the invention. Therefore, the above exemplary embodiments should be regarded as illustrative rather than limiting in all aspects. For example, components which have been described as being a single unit can be embodied in a distributed form, whereas components which have been described as being distributed can be embodied in a combined form.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A system, comprising:
a single camera attached to a side of a vehicle;
a memory configured to store processor-executable instructions for correcting an error of an image captured by the single camera; and
a processor configured with the processor-executable instructions to:
detect a correction point in the image captured by the single camera;
generate a correction parameter based on a resultant value of a comparison between the detected correction point and a preset correction point that is set as a default at a time of manufacturing or repairing a vehicle; and
correct the error of the image based on the generated correction parameter.

2. The system of claim 1, wherein the processor is further configured with the processor-executable instructions to:
extract a contour line from the image; and
detect the correction point in the image from which the contour line is extracted.

3. The system of claim 2, wherein the processor is further configured with the processor-executable instructions to:
detect a plurality of lines in the image from which the contour line is extracted;
detect a vanishing point at which the plurality of lines intersect; and
move the detected vanishing point to a reference vanishing point to generate the correction parameter, and
wherein the correction point is the vanishing point.

4. The system of claim 2, wherein the processor is further configured with the processor-executable instructions to:

detect a plurality of feature points corresponding to the vehicle in the image from which the contour line is extracted; and move the plurality of feature points to reference feature points to generate the correction parameter, and wherein the correction points are the plurality of feature points of the vehicle.

5. The system of claim 1, wherein the processor is further configured with the processor-executable instructions to:

generate the correction parameter when the vehicle is driven or stopped; and update a previously stored correction parameter to the generated correction parameter.

6. A method, comprising:

receiving an image captured by a single camera attached to a side of a vehicle;

detecting a correction point in the image;

comparing the detected correction point and a preset correction point that is set as a default at a time of manufacturing or repairing a vehicle;

generating a correction parameter based on a resultant value of the comparison; and correcting an error of the image based on the generated correction parameter.

7. The method of claim 6, further comprising extracting a contour line from the image, wherein the detecting of the correction point comprises detecting the correction point in the image from which the contour line is extracted.

8. The method of claim 7, wherein the detecting of the correction point in the image further comprises:

detecting a plurality of lines in the image from which the contour line is extracted;

detecting a vanishing point at which the plurality of lines intersect; and setting the detected vanishing point as the correction point, wherein the comparing of the detected correction point and the preset correction point and the generating of the correction parameter based on the resultant value of the comparison comprise moving the detected vanishing point to a reference vanishing point to generate the correction parameter.

9. The method of claim 7, wherein the detecting of the correction point in the image further comprises:

detecting a plurality of feature points corresponding to the vehicle in the image from which the contour line is extracted; and setting the plurality of feature points as the correction points, wherein the comparing of the detected correction point and the preset correction point and the generating of the correction parameter based on the resultant value of the comparison comprise moving the detected feature points to reference feature points to generate the correction parameter.

10. The method of claim 6, wherein the generating of the correction parameter comprises generating the correction parameter when the vehicle is driven or stopped and updating a previously stored correction parameter to the generated correction parameter.

* * * * *